(12) United States Patent
Rolf

(10) Patent No.: US 7,717,334 B1
(45) Date of Patent: May 18, 2010

(54) SYSTEM AND METHOD FOR MONITORING VOICE/DATA USAGE AND FINANCIAL TRANSACTIONS MADE THROUGH A COMMUNICATIONS SERVICE

(75) Inventor: Devon A. Rolf, Paola, KS (US)

(73) Assignee: GoFigure Payments, LLC, Paola, KS (US)

( * ) Notice: Subject to any disclaimer, the term of this patent is extended or adjusted under 35 U.S.C. 154(b) by 880 days.

(21) Appl. No.: 11/485,683

(22) Filed: Jul. 13, 2006

(51) Int. Cl.
*G06K 5/00* (2006.01)
(52) U.S. Cl. .......................... 235/380; 235/381; 705/14
(58) Field of Classification Search ................. 235/380, 235/375, 381; 705/14, 26, 52
See application file for complete search history.

(56) References Cited

U.S. PATENT DOCUMENTS

| | | | |
|---|---|---|---|
| 5,806,045 A * | 9/1998 | Biorge et al. ................... | 705/14 |
| 5,870,722 A | 2/1999 | Albert et al. | |
| 5,987,429 A | 11/1999 | Maritzen et al. | |
| 6,038,552 A | 3/2000 | Fleischl et al. | |
| 6,119,106 A | 9/2000 | Mersky et al. | |
| 6,233,568 B1 | 5/2001 | Kara | |
| 6,347,305 B1 | 2/2002 | Watkins | |
| 6,829,588 B1 | 12/2004 | Stoutenburg et al. | |
| 6,876,979 B2 | 4/2005 | Ling | |
| 7,089,208 B1 | 8/2006 | Levchin et al. | |
| 7,376,583 B1 | 5/2008 | Rolf | |
| 2002/0152160 A1 | 10/2002 | Allen-Rouman et al. | |
| 2003/0004868 A1 | 1/2003 | Early et al. | |
| 2003/0144942 A1 | 7/2003 | Sobek | |
| 2004/0039694 A1 | 2/2004 | Dunn et al. | |
| 2004/0111361 A1 | 6/2004 | Griffiths et al. | |
| 2004/0111370 A1 | 6/2004 | Saylors et al. | |
| 2004/0225545 A1 | 11/2004 | Turner et al. | |
| 2005/0027700 A1 | 2/2005 | Turner et al. | |
| 2005/0033691 A1 | 2/2005 | Whewell et al. | |
| 2005/0037731 A1 | 2/2005 | Whewell et al. | |
| 2005/0044018 A1 * | 2/2005 | Whewell ...................... | 705/34 |
| 2005/0149416 A1 * | 7/2005 | Benco et al. ................... | 705/34 |
| 2006/0026099 A1 * | 2/2006 | Danz et al. ..................... | 705/44 |
| 2006/0129504 A1 | 6/2006 | Nakajima | |
| 2006/0212393 A1 | 9/2006 | Brown | |
| 2006/0224477 A1 | 10/2006 | Garcia et al. | |
| 2006/0248015 A1 * | 11/2006 | Baartman et al. ............. | 705/52 |
| 2006/0294025 A1 | 12/2006 | Mengerink | |
| 2007/0022214 A1 | 1/2007 | Harcourt | |
| 2007/0287413 A1 | 12/2007 | Kleitsch et al. | |

(Continued)

OTHER PUBLICATIONS

U.S. Appl. No. 10/668,409, filed Sep. 23, 2003; Applicant: Rolf, Devon A.

(Continued)

*Primary Examiner*—Ahshik Kim
(74) *Attorney, Agent, or Firm*—Hovey Williams LLP

(57) ABSTRACT

A system and method for substantially increasing billing flexibility on communications or media accounts which also offer user users the ability to make electronic purchases or other financial transactions, where those transactions are accounted for with an additional account or with the same account through which the media or communications services are offered. Charges associated with use of the communications service or making of the financial transactions may be increased or reduced depending on such factors as volume of use, number of transactions, and a monetary value of the transactions.

11 Claims, 3 Drawing Sheets

U.S. PATENT DOCUMENTS

2008/0195498 A1* 8/2008 Crawford et al. .............. 705/21

OTHER PUBLICATIONS

Non-Final Office Action dated Feb. 5, 2008, in U.S. Appl. No. 10/668,409; Applicant: Rolf, Devon A.

Amendment dated Aug. 8, 2008, in U.S. Appl. No. 10/668,409; Applicant: Rolf, Devon A.

Non-Final Office Action dated Jan. 2, 2009, in U.S. Appl. No. 10/668,409; Applicant: Rolf, Devon A.

Amendment dated May 4, 2009, in U.S. Appl. No. 10/668,409; Applicant: Rolf, Devon A.

* cited by examiner

SYSTEM AND METHOD FOR MONITORING VOICE/DATA USAGE AND FINANCIAL TRANSACTIONS MADE THROUGH A COMMUNICATIONS SERVICE

BACKGROUND OF THE INVENTION

1. Field of the Invention

The present invention relates broadly to systems and methods for assessing charges for use of a communications service, particularly use of the service to make electronic financial transactions. In particular, the present invention concerns a system and method for monitoring use of a voice and/or data communications service or media service and the making of electronic financial transactions initiated by a communications device associated with the service, and for adjusting charges associated with the use of the service or the making of the transactions based on such factors as, for example, an amount of use, a number of transactions, or a monetary value associated with the transactions.

2. Description of the Prior Art

Systems and methods for making electronic purchase or other financial transactions with a communications device, or an account associated with a communications device, and related financial gateways and middle-ware solutions, have been proposed.

SUMMARY OF THE INVENTION

The present invention concerns a convergence billing system and methodology for utilization in conjunction with the aforementioned prior art systems and methods. In particular, the present invention provides a system and method for substantially increasing billing flexibility on communications or media accounts which also offer users the ability to make electronic purchase transactions, where those transactions are accounted for with an additional account or with the same account through which the media or communications services are offered.

In a preferred embodiment of the present invention, a processor monitors use of voice and/or data communications services. The services monitored may be telecommunications services, such as a telephone service or wireless services, including voice and/or data over IP. It should be appreciated that such monitoring and billing services are conventional, and a specific customer account associated with the service may be subject any of a plurality of different rate plans. The processor monitors use of a particular service over a given period of time and calculates charges based upon the volume of use of the voice and/or data service and the particular rate plan of the account holder. Additionally, the service monitored by the present invention may be a media service, such as, for example, cable or satellite television or broadband cable services, or may manage accounts for electronic content aggregators such as Internet, or interactive television, or interactive radio portals.

Additionally, the processor monitors financial transactions made via an input device associated with the particular account of the account holder being monitored. The input device may be, for example, a wireless communications device, a telephone, or a conventional debit or credit card. Additionally, the input device may be a telematics device, a PC, interactive (e.g., Internet connected) television or other interactive terminal. The transactions monitored may be transactions that are facilitated directly with the account of the account holder or with a second account associated with the account of the account holder.

Thus, for example, the present invention may be adapted to monitor debit or credit transactions which are settled directly to a communications, media, or content aggregation account, or to a more conventional bank account by way of a separately offered debit or credit card which is associated with the account. Furthermore, the present invention may be adapted to monitor and track cash transactions wherein data indicative of cash is transmitted directly from an electronic device to a merchant terminal.

In accordance with an aspect of the present invention, the processor may be programmed to monitor widely flexible rate plans in such environments. In one embodiment, for example, a threshold corresponding to a particular number or accumulated monetary value of transactions for a given period (e.g., one billing cycle) may be established and programmed. When the number of transactions, or the cumulative monetary value associated with the transactions for the given period reaches the threshold, the processor adjusts a rate plan associated with either the voice and/or data communications services (or content or media services) or the transactions, or both. In other words, once a threshold is met, monetary charges associated with the various services may be adjusted, either upwardly or downwardly. Additionally, the system can be configured such that only those charges accrued after the threshold is met are adjusted, or such that all charges for the given period are adjusted once the threshold is met.

In accordance with an additional aspect of the present invention, additional thresholds may be established, such that rate plans associated with either the communications services or the transactions, or both, are adjusted at additional threshold levels.

In an alternate embodiment of the present invention, the threshold that is established is a threshold associated with the volume of usage of the voice and/or data communications services, media services, or content aggregation services. Accordingly, a rate plan associated with an account is dependent on the volume of usage of the account. In this embodiment, when a threshold is met, the processor makes adjustments to the rates associated with the services or charges associated with the transactions made, or both. As before, these adjustments may be upward or downward, and may apply to the entire billing cycle or to only those charges incurred after the threshold is met. As before, additional threshold levels may be established.

In still another embodiment of the present invention, an unpaid balance associated with the account of the account holder is monitored. When the unpaid balance reaches a selected threshold, rates associated with the communications service or the transaction, or both, are adjusted. Again, the rates may be adjusted upwardly or downwardly.

As will be described in greater detail below, it should be understood and appreciated that the various rates which can be adjusted include a fixed periodic rate associated with use of the services, a variable rate associated with the number of minutes or quantity and/or type of data transmitted, and/or interest rates associated with unpaid balances. Also, an interest rate associated with deposits could be adjusted or invoked at certain points.

There may also be no charge, for example, for a transaction or for the first number of transactions, and when the rate is adjusted it may change from zero to some non-zero positive number.

The processor preferably monitors a large number of accounts provided by different service providers. Additionally, the processor preferably stores information indicative of usage of the accounts and transactions made in a memory. Additionally, periodic reports summarizing the details of all accounts of a particular service provider may be prepared, transmitted and/or printed. Additionally, individual account holder statements may be prepared and transmitted electronically, or printed and distributed according to the principles of the present invention.

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENTS

With reference to the figures, a system and method is herein described, shown, and otherwise disclosed in accordance with the preferred embodiments of the present invention. In each of the various embodiments of the present invention, a processor (or a plurality of processors) is provided. The processor includes a memory having software stored therein. The processor monitors usage of a communications account, content aggregation account, or media account by a user. It should be understood and appreciated that a number of processors may be utilized, such as in the case of a matrix or grid of processors, and, additionally, it should be understood and appreciated that functions of the present invention may be performed by different processors and the data subsequently converged. For example, one processor (or group of processors) may monitor voice and/or data communications usage, while another processor (or group of processors) monitors transactions made. For purposes of the present description, a single processor will be referenced for clarity, but it should be understood that multiple processors, and indeed multiple groups of processors, may be employed.

Figure 1:
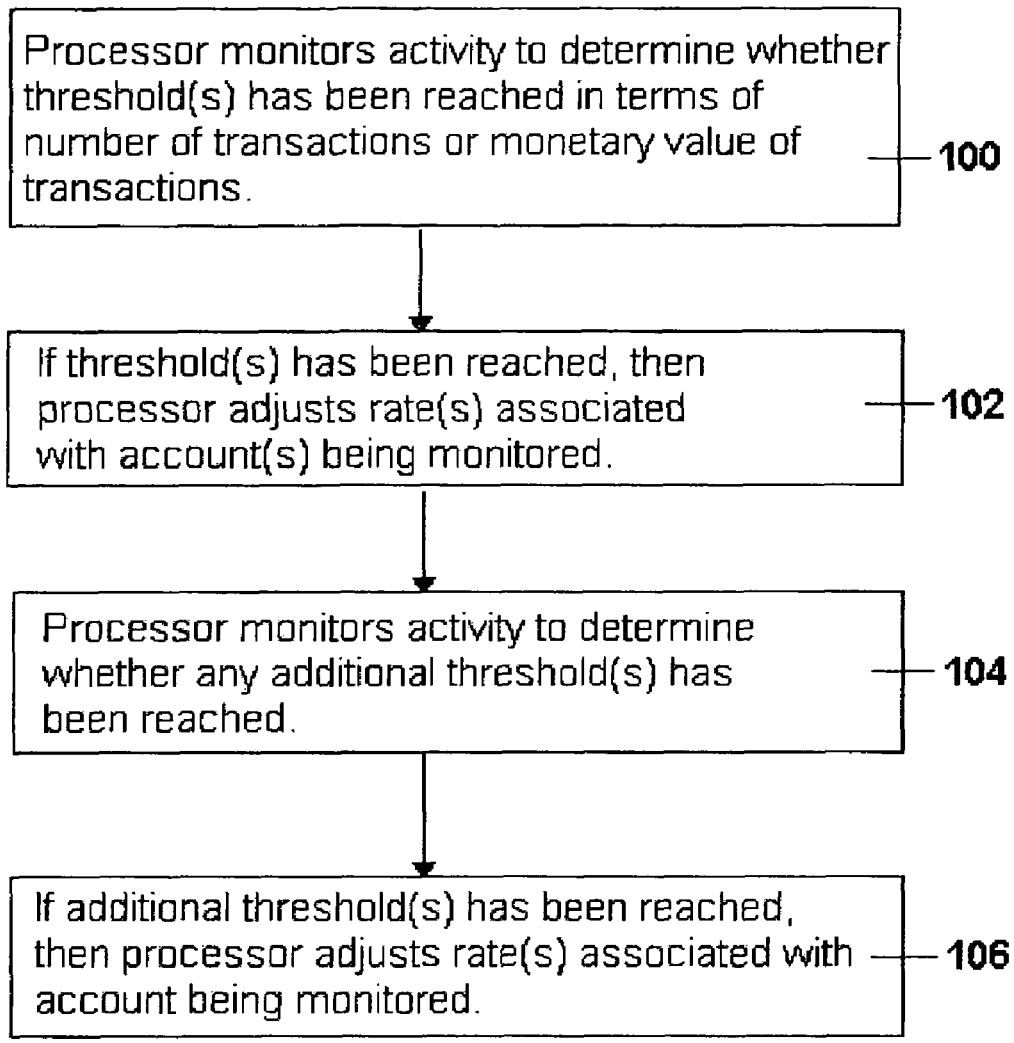
FIG. 1 is a flowchart of steps involved in practicing a preferred first embodiment of the method of the present invention.

Referring particularly to FIG. 1, a preferred first embodiment of the present invention is illustrated and described. At step 100, the processor determines whether a number of transactions, or a cumulative monetary amount associated with transactions made within a given period, have reached a pre-established threshold amount. In this regard, the processor may be programmed to monitor either the number of transactions made during a given period (such as a billing cycle), the cumulative monetary amount associated with transactions made during the period, or both. Accordingly, it should be understood that step 100 may be divided into two steps: one for monitoring the number of transactions made, and the other for monitoring the cumulative monetary amount associated with made transactions within a given period. Alternatively, the processor may be programmed so that only one of these particular thresholds is monitored. Additionally, in the case where two thresholds at step 100 are monitored, the processor can be programmed so that only one of the thresholds need be met, or that both of them need be met. For purposes of the present description, it will be assumed that only a single threshold is being monitored at step 100.

When it is determined at step 100 that the threshold (or thresholds) has not been met, a rate plan corresponding to the account being monitored is maintained at a status quo. When, however, it is determined at step 100 that the threshold has been met, processing advances to step 102, at which the processor reestablishes rates associated with the account being monitored. In this regard, in one embodiment of the present invention, the rates suggested are only those rates associated with voice and/or data usage associated with the account. Additionally, in one variation of the present invention, only those rates associated with such usages which are incurred after the threshold has been met, and within the given period, are adjusted. Alternatively, the processor may be programmed so that once the threshold has been met all rates associated with voice and/or data communications usage for the given period are adjusted.

Additionally, still at step 102, depending on the implementation details of the present invention and the desires of a particular service provider, and/or account holder agreements, the rates under consideration may be adjusted upwardly once the threshold has been met or, alternatively, adjusted downwardly.

As an example, assume that the type of account being monitored is a wireless communications account. Assume further that the account holder pays a monthly fee of U.S. $50.00 for the account and, in return, obtains X number of usage minutes of voice or data transmission at no additional charge. Once X minutes have been reached, however, additional minutes of usage of voice communications during the period are charged at a rate of $0.20 per minute.

Additionally, assume that any purchase transactions made on the account, or on a second account associated with the account, invoke a transaction fee (which may be fixed or may be a percentage of the transaction). Also assume that the first three transactions made during the period involve only a $0.25 transaction fee. Accordingly, the threshold at step 100 would be set at three transactions and when the user had made three transactions and was making his or her fourth transaction the answer at step 100 would be "yes" because the number of transactions (four) within the period exceeded the threshold (three), and processing would advance to step 102, at which the processor would adjust the rate. As has been illustrated and described, those rates which can be adjusted can vary widely depending on the particular implementation details of the present invention, which illustrates the remarkable flexibility of the present invention. For purposes of this example, however, assume that the rate to be adjusted is the transaction fee associated with transactions made. Accordingly, at step 102, the processor would adjust the transaction fee rate to a second rate, corresponding to the surpassed threshold, which, for purposes of this example, is assumed to be $1.00. Accordingly, for all additional transactions made during the period (which may, for example, be a billing cycle) the transaction charge will be $1.00.

It should be understood and appreciated that the foregoing example is for illustration only and is not meant to be limiting; other rates could have additionally or alternatively been adjusted. Furthermore, such rates could have been adjusted upwardly or downwardly, depending on the nature of the plan of usage and implementation. For example, the transaction fee could have been adjusted upwardly or downwardly and could have been adjusted only for those transactions made after the threshold was met, before the threshold was met, or for all transactions within the period. Additionally, the fixed monthly fee associated with the voice and/or data usage could have been adjusted upwardly or downwardly after the threshold was met, or the cost per minute of voice and/or data usage could have been adjusted upwardly or downwardly. Additionally or alternatively, an interest rate associated with unpaid balances on the account, or the second account associated with the account holder's account, could have been adjusted upwardly or downwardly. As will be appreciated, the interest rate could be adjusted for the entirety of the balance, or only for those charges accrued before or after the threshold was met.

Steps 104 and 106 are illustrative of an additional threshold to be monitored. It should be understood that the second threshold could monitor the same characteristic as the first threshold, such as the number of transactions, or could monitor a different characteristic, such as the volume of voice and/or data usage. As illustrated, when the threshold is established, a particular selected rate is adjusted at step 106. Again, the rate adjusted may be a fixed rate, a usage rate associated with a number of minutes or volume of data, a transaction fee, an interest rate, etc. Additionally, it should be understood and appreciated that the present invention encompasses invoking an interest rate, removing an interest rate, or otherwise increasing or decreasing an interest rate, where that interest is interest paid to the account holder on monies deposited in an account associated with the services being monitored.

Figure 2:
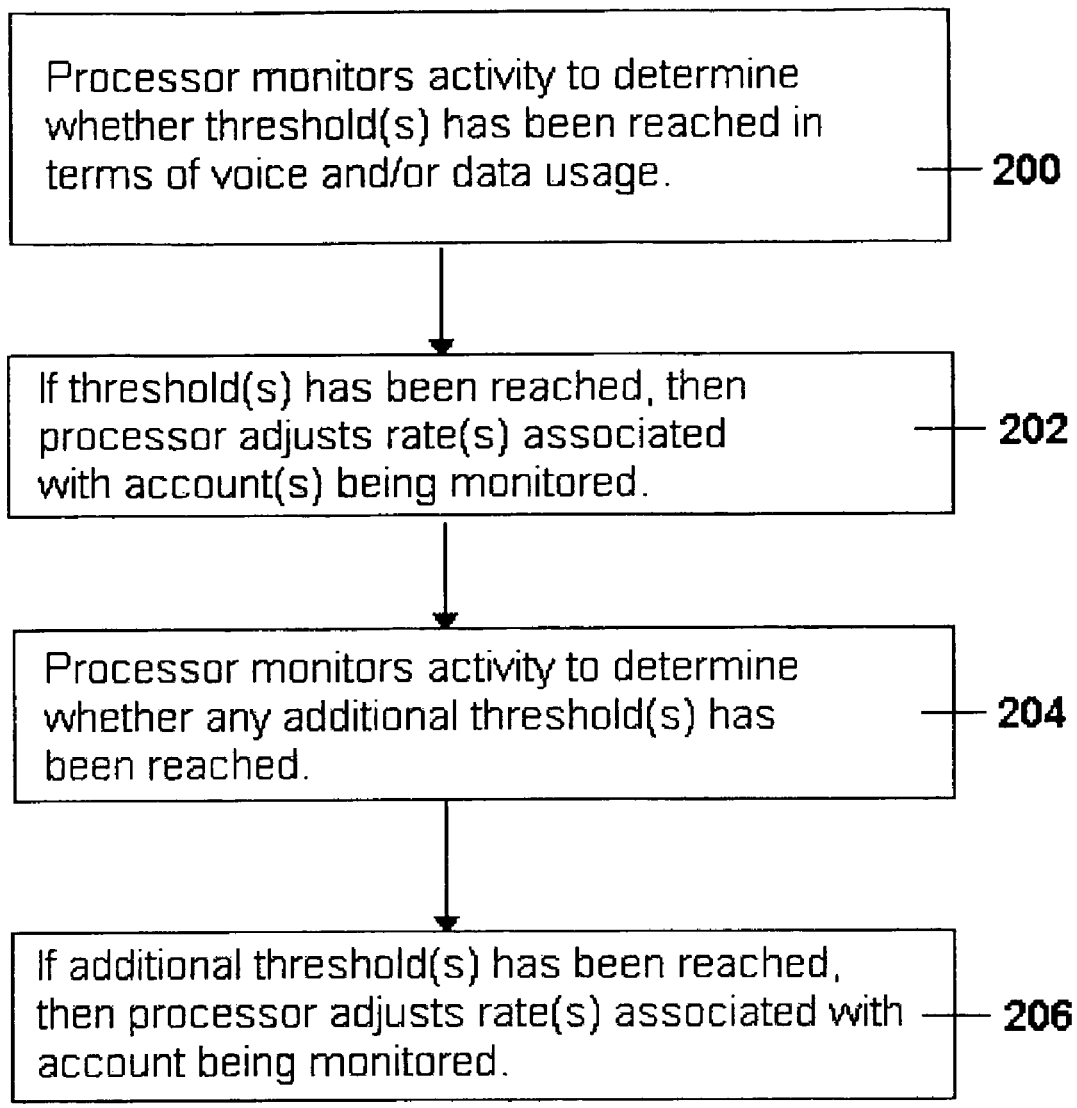
FIG. 2 is a flowchart of steps involved in practicing a preferred second embodiment of the method of the present invention.

Referring particularly to FIG. 2, a preferred second embodiment of the present invention is illustrated and described which is substantially similar to that of FIG. 1 but for the following differences. In FIG. 2, at step 200, the volume of voice and/or data usage is monitored in conjunction with an established threshold. When that threshold is reached, processing advances to step 202 at which one or more rates are adjusted. Preferably, in the embodiment of FIG. 2, the adjusted rate is the rate associated with transactions being made with the account, or with a second account associated with the account. For example, the transaction fee may be invoked, eliminated, or increased or decreased, or interest associated with an unpaid balance, or an unpaid balance resulting from additional charges, may be adjusted. Steps 204, 206 are illustrative of a second threshold being established, with additional adjustments being made when that threshold is met. It should be understood that the second threshold may simply be the same characteristic as the first threshold (such as volume of voice and/or data usage), but may be a higher volume of usage during the period.

Figure 3:
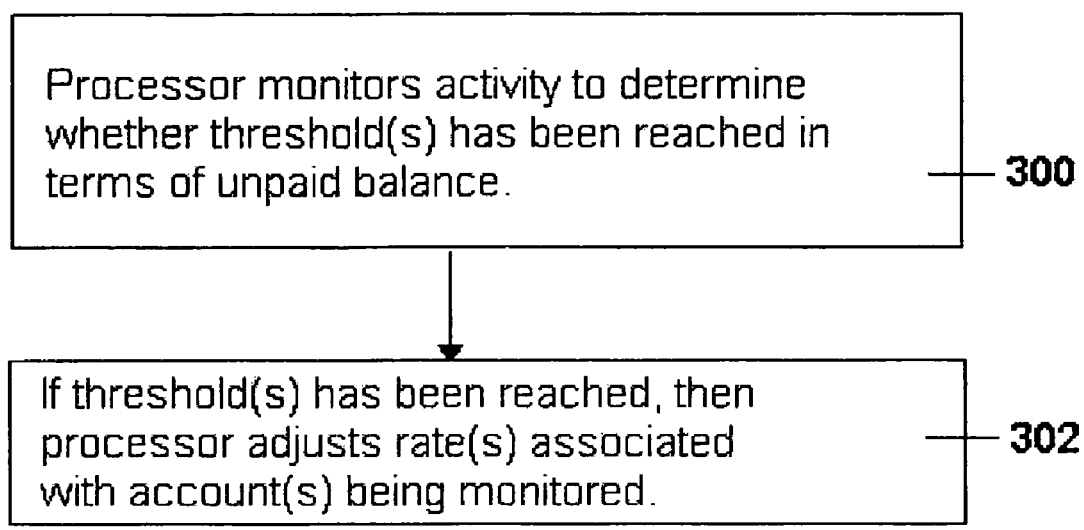
FIG. 3 is a flowchart of steps involved in practicing a preferred third embodiment of the method of the present invention.

Referring particularly to FIG. 3, a preferred third embodiment of the present invention is illustrated and described. At step 300, the processor determines whether an unpaid balance associated with the account holder's account, or with an additional account which corresponds to the account holder's account, has been reached. When the threshold has been reached, a rate plan corresponding to usage of voice and/or data (or media or content) services is adjusted. For example, a fixed periodic rate, or a rate associated with minutes of use or volume or type of data, is adjusted, upwardly or downwardly, depending on the embodiment, when the threshold has been met. As will be understood, because an unpaid balance may carry over from month-to-month, this particular rate adjustment at step 302 may also carry over to a next billing period. From the foregoing, it will be seen that this invention is one well adapted to attain any and all ends and objects hereinabove set forth together with the other advantages which are obvious and which are inherent.

It will be understood that certain features and subcombinations are of utility and may be employed with reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

The invention claimed is:

1. A method of determining charges for usage of a communications service, the method comprising the steps of:
   monitoring, over a period of time, use of the communications service and initiation of financial transactions associated with an account;
   determining the charges based upon a combination of use of the communications service and initiation of the financial transactions; and
   when a monetary value of the financial transactions made within the period of time reaches a pre-established threshold, increasing at least some of the charges.

2. The method as set forth in claim 1, wherein only the charges for use of the communications service after the pre-established threshold is reached are increased.

3. The method as set forth in claim 1, wherein all charges associated with use of the communications service within the period of time are increased.

4. The method as set forth in claim 1, wherein the pre-established threshold is a first threshold, and the method further comprising the steps of establishing a second threshold that is greater than the first threshold, and, when a number of the financial transactions or a monetary value associated with the financial transactions reaches the second threshold, further increasing the charges associated with at least some use of the communications service within the period of time.

5. The method as set forth in claim 1, wherein said method comprises a computer-implemented method, and wherein said monitoring use of a communications service comprises monitoring with a processor use of a wireless voice and data communications service, and wherein said monitoring initiation of financial transactions associated with an account comprises monitoring with a processor purchase transactions initiated with a mobile wireless communications device associated with said wireless communications service.

6. A system comprising:
   a device for allowing a user to use a communications service and to initiate financial transactions with an account, wherein said communications service has charges corresponding to use of the communications service;
   a memory for storing the account; and
   a processor, wherein the processor monitors, over a period of time, use of the communications service and initiation of financial transactions associated with the account, determines the charges based upon a combination of use of the communications service and initiation of the financial transactions and, when a monetary value of the financial transactions made within the period of time reaches a pre-established threshold, increases at least some of the charges.

7. The system as set forth in claim 6, wherein said device comprises a mobile wireless communications device and said communications service comprises a wireless communications service, wherein said financial transactions comprise purchase transactions made with said mobile wireless communications device.

8. A method of determining a rate plan associated with usage of a communications service, the method comprising the steps of:
   monitoring, over a period of time, use of the communications service and making of financial transactions using an account associated with the communications service; and adjusting the rate plan when an unpaid balance on the account reaches a pre-established threshold.

9. A system comprising:

a device for allowing a user to use a communications service and to make a financial transaction with an account associated with the communications service, wherein said use of said communications service is according to a rate plan corresponding to the communications service;

a memory for storing the account; and a processor, wherein said processor monitors, over a period of time, use of the communications service and making of financial transactions using the account associated with the communications service and adjusts the rate plan when an unpaid balance on the account reaches a pre-established threshold.

10. The system as set forth in claim 9, wherein said device comprises a mobile wireless communications device and said communications service comprises a wireless service, wherein said financial transactions comprise purchase transactions made with said mobile wireless communications device.

11. The method as set forth in claim 8, wherein said method comprises a computer-implemented method, and wherein said monitoring use of a communications service comprises monitoring with a processor use of a wireless voice and data communications service, and wherein said monitoring initiation of financial transactions associated with an account comprises monitoring with a processor purchase transactions initiated with a mobile wireless communications device associated with said wireless communications service.

* * * * *